United States Patent
Yasue (10) Patent No.: US 12,224,694 B2
(45) Date of Patent: Feb. 11, 2025

(54) MOTOR CONTROL DEVICE AND MOTOR CONTROL SYSTEM

(71) Applicant: Mitsubishi Electric Corporation, Tokyo (JP)

(72) Inventor: Takashi Yasue, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/716,540

(22) PCT Filed: Jun. 10, 2022

(86) PCT No.: PCT/JP2022/023451
§ 371 (c)(1),
(2) Date: Jun. 5, 2024

(87) PCT Pub. No.: WO2023/238381
PCT Pub. Date: Dec. 14, 2023

(65) Prior Publication Data
US 2024/0421749 A1    Dec. 19, 2024

(51) Int. Cl.
*H02P 29/68*    (2016.01)
*B25J 13/08*    (2006.01)
*H02P 29/032*    (2016.01)

(52) U.S. Cl.
CPC ............ *H02P 29/68* (2016.02); *B25J 13/088* (2013.01); *H02P 29/032* (2016.02)

(58) Field of Classification Search
CPC ........ H02P 29/032; H02P 29/60; H02P 29/64; H02P 29/66; H02P 29/68; H02P 27/06;
(Continued)

(56) References Cited

U.S. PATENT DOCUMENTS 9,484,788 B2    11/2016  Matsumoto
2020/0052642 A1*  2/2020  Kuroki ................ H02P 29/60

FOREIGN PATENT DOCUMENTS

JP    2007-215250 A    8/2007
JP    2012-034427 A    2/2012
(Continued)

OTHER PUBLICATIONS

International Search Report and Written Opinion mailed on Aug. 2, 2022, received for PCT Application PCT/JP2022/023451, filed on Jun. 10, 2022, 8 pages including English Translation.
(Continued)

*Primary Examiner* — Antony M Paul
(74) *Attorney, Agent, or Firm* — XSENSUS LLP (57) ABSTRACT

A motor control device includes, on a printed circuit board, an acceleration sensor that detects an acceleration corresponding to a posture of the printed circuit board, and outputs, as acceleration information, the acceleration detected, a temperature sensor that detects a temperature on the printed circuit board, and outputs, as detected temperature, the temperature detected, an inverter circuit that drives a motor, and a control circuit that calculates posture information indicating the posture of the printed circuit board on the basis of the acceleration information, calculates temperature information indicating a temperature of a part disposed on the printed circuit board on the basis of the detected temperature, and controls the inverter circuit by outputting, to the inverter circuit, a power supply command for the motor based on a temperature threshold set for each piece of the posture information, the posture information, and the temperature information.

7 Claims, 4 Drawing Sheets

(58) Field of Classification Search
CPC ...... H02P 27/08; H02P 2207/05; H02P 25/03; H02P 25/064; H02P 25/062; H02P 1/46; H02P 1/24; B25J 13/088; B25J 17/00; B25J 17/0283; B25J 17/0258; B25J 17/0241; B25J 19/0054
USPC ............ 901/32, 27, 28, 30, 46, 8, 1, 23, 19
See application file for complete search history.

(56) References Cited

FOREIGN PATENT DOCUMENTS

| | | |
|---|---|---|
| JP | 2013-223360 A | 10/2013 |
| JP | 2015-033995 A | 2/2015 |
| JP | 2020-068108 A | 4/2020 |
| WO | 2021/255999 A1 | 12/2021 |

OTHER PUBLICATIONS

Decision to Grant mailed on Jan. 24, 2023, received for JP Application 2022-566409, 5 pages including English Translation.

* cited by examiner

MOTOR CONTROL DEVICE AND MOTOR CONTROL SYSTEM

CROSS-REFERENCE TO RELATED APPLICATION

This application is a national stage application, pursuant to 35 U.S.C. § 371, of International Patent Application No. PCT/JP2022/023451, filed Jun. 10, 2022, the entire contents of which are incorporated herein by reference.

FIELD

The present disclosure relates to a motor control device and a motor control system that control a motor.

BACKGROUND

A motor control device includes an inverter circuit that supplies power to a motor such as a servo motor. In the motor control device, the inverter circuit generates heat during an operation of the inverter circuit, and the temperature in the motor control device increases. Therefore, in a typical motor control device, a heat dissipation mechanism for dissipating heat is provided in a housing that houses the inverter circuit. Furthermore, in the typical motor control device, a temperature sensor that detects the temperature of the heat dissipation mechanism is provided and stops the operation of the inverter circuit according to the detected temperature. Furthermore, there is a case where the motor control device is installed in various installation postures in consideration of a device to be driven or other devices. In such a motor control device, it has been known that an effect of the heat generation of the inverter circuit on heat generation of the entire motor control device largely varies depending on the installation posture of the motor control device.

Therefore, a motor control device described in Patent Literature 1 detects an inclination of a housing by an acceleration sensor disposed in the housing for housing an inverter circuit and detects the temperature of a heat sink by a temperature sensor disposed in the heat sink of the housing. Then, the motor control device described in Patent Literature 1 determines whether or not the temperature of the motor control device has an anomaly on the basis of the detected inclination amount and temperature, and in a case where the temperature has an anomaly, the motor control device stops an operation of a motor.

CITATION LIST

Patent Literature

Patent Literature 1: Japanese Patent Application Laid-open No. 2012-034427

SUMMARY OF INVENTION

Problem to be Solved by the Invention

However, with the technique of Patent Literature 1, while a part of which the temperature is to be detected is mounted on a printed circuit board, the temperature detected by a temperature sensor is the temperature of a heat sink, and a large error is caused between the temperature detected by the temperature sensor and an actual temperature of the part. Furthermore, the motor control device described in Patent Literature 1 acquires an installation posture of the motor control device by detecting an inclination of a housing by an acceleration sensor disposed in the housing. However, in a case where an installation posture of the printed circuit board on which the part of which the temperature is to be detected is mounted changes independently from the housing or in a case where the housing is not included, the motor control device cannot acquire the installation posture of the printed circuit board on which the part of which the temperature is to be detected is mounted. Therefore, there has been a problem in that the motor control device described in Patent Literature 1 cannot control the motor according to an accurate heat generation state of the part mounted on the printed circuit board.

The present disclosure has been made in view of the above, and an object of the present disclosure is to obtain a motor control device that can control a motor according to an accurate heat generation state of a part mounted on a printed circuit board.

Means to Solve the Problem

In order to solve the above-stated problems and achieve the object, a motor control device according to the present disclosure comprises: an acceleration sensor to be disposed on a printed circuit board, detect an acceleration corresponding to a posture of the printed circuit board, and output, as acceleration information, the acceleration detected; and a temperature sensor to be disposed on the printed circuit board, detect a temperature on the printed circuit board, and output, as detected temperature, the temperature detected. The motor control device according to the present disclosure further comprises: an inverter circuit to be disposed on the printed circuit board and drive a motor; and a control circuit to be disposed on the printed circuit board, calculate posture information indicating the posture of the printed circuit board on the basis of the acceleration information, calculate temperature information indicating a temperature of a part disposed on the printed circuit board on the basis of the detected temperature, and control the inverter circuit by outputting, to the inverter circuit, a power supply command for the motor based on a temperature threshold set for each piece of the posture information, the posture information, and the temperature information.

Effects of the Invention

A motor control device according to the present disclosure achieves an effect such that it is possible to control a motor according to an accurate heat generation state of a part mounted on a printed circuit board.

DESCRIPTION OF EMBODIMENTS

Hereinafter, a motor control device and a motor control system according to an embodiment of the present disclosure will be described in detail with reference to the drawings.

Embodiment

Figure 1:
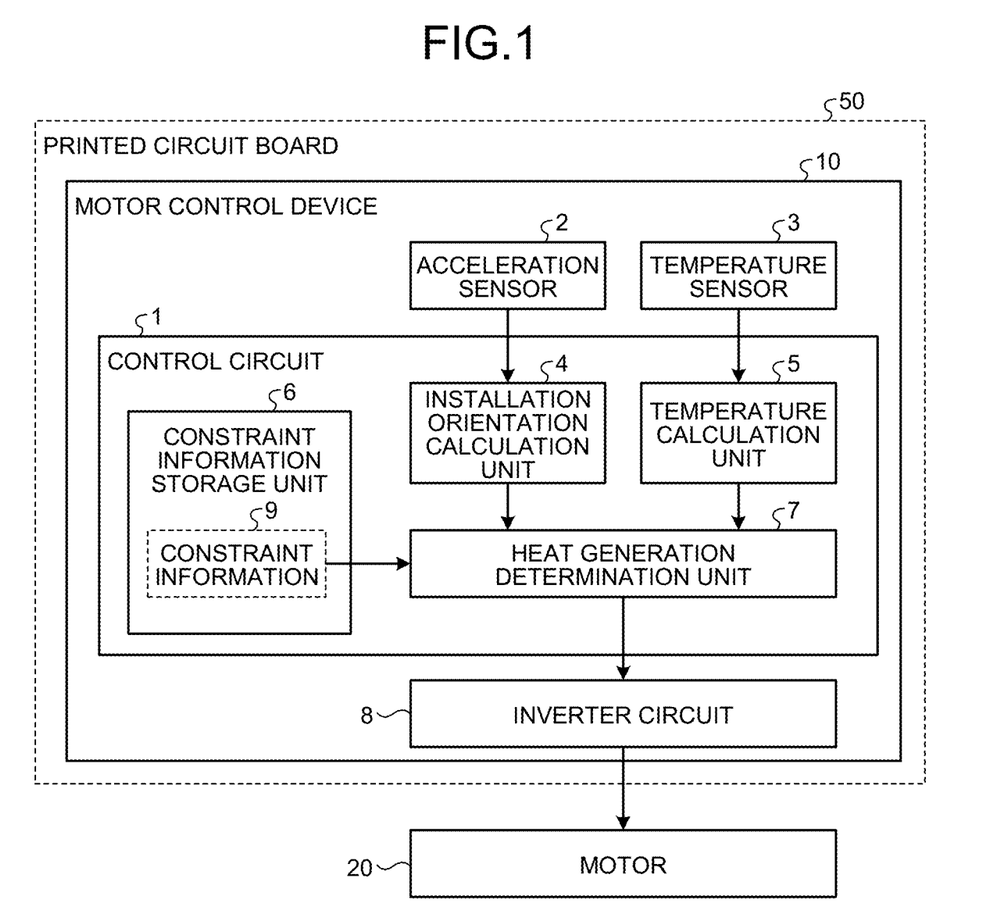
FIG. 1 is a diagram illustrating a configuration of a printed circuit board including a motor control device according to an embodiment.

FIG. 1 is a diagram illustrating a configuration of a printed circuit board including a motor control device according to an embodiment. On a printed circuit board 50, each part included in a motor control device 10 is disposed. The motor control device 10 is connected to a motor 20 such as a servo motor and controls the motor 20.

The motor control device 10 includes a control circuit 1, an acceleration sensor 2, a temperature sensor 3, and an inverter circuit 8 that drives the motor 20. That is, all of the control circuit 1, the acceleration sensor 2, the temperature sensor 3, and the inverter circuit 8 are disposed on the printed circuit board 50. The control circuit 1 includes an installation orientation calculation unit 4, a temperature calculation unit 5, a constraint information storage unit 6, and a heat generation determination unit 7.

The temperature sensor 3 detects the temperature on the motor control device 10 and sends a detected temperature indicating the temperature detected to the temperature calculation unit 5. An example of the temperature sensor 3 is a temperature thermistor. The temperature calculation unit 5 calculates temperature information indicating the temperature of a part (for example, inverter circuit 8) of which the temperature is monitored, on the basis of the detected temperature detected by the temperature sensor 3.

Note that the part of which the temperature is monitored may be any part on the printed circuit board 50. However, in the present embodiment, a case will be described where the part of which the temperature is monitored is the inverter circuit 8 on the printed circuit board 50. The temperature calculation unit 5 sends the calculated temperature information of the inverter circuit 8 to the heat generation determination unit 7.

The acceleration sensor 2 detects accelerations in three axial directions of the motor control device 10 including an X-axis direction, a Y-axis direction, and a Z-axis direction orthogonal to each other and sends acceleration information indicating the detected acceleration to the installation orientation calculation unit 4. The Z-axis direction is, for example, a vertical direction, and an XY plane is a horizontal plane.

The installation orientation calculation unit 4 calculates posture information indicating the orientation in which the printed circuit board 50 that functions as the motor control device 10 is installed (installation posture), on the basis of the acceleration information sent from the acceleration sensor 2. The installation orientation calculation unit 4 calculates the posture information indicating inclinations in the three axial directions including the X-axis direction, the Y-axis direction, and the Z-axis direction of the motor control device 10. The installation orientation calculation unit 4 sends the calculated posture information to the heat generation determination unit 7.

The constraint information storage unit 6 is a memory or the like that stores constraint information 9 in advance. The constraint information 9 is information indicating a first temperature threshold and a second temperature threshold, set for each piece of the posture information. That is, in the constraint information 9, the posture information is associated with the first temperature threshold and the second temperature threshold. In this way, in the present embodiment, the first temperature threshold and the second temperature threshold are set for each posture of the printed circuit board 50. The second temperature threshold is a value higher than the first temperature threshold. The first temperature threshold is a threshold used to determine whether or not to reduce a power supply amount to the motor 20. The second temperature threshold is a threshold used to determine whether or not to stop power supply to the motor 20. That is, the first temperature threshold is a temperature upper limit value when determining to reduce the power supply amount to the motor 20, and the second temperature threshold is a temperature upper limit value when determining to stop the power supply to the motor 20.

The first temperature threshold and the second temperature threshold are set on the basis of an arrangement relationship between a monitoring target part (inverter circuit 8 in the present embodiment) that is the part of which the temperature is monitored on the printed circuit board 50 and the temperature sensor 3, or the like. The arrangement relationship is a distance between the monitoring target part and the temperature sensor 3, a thermal conductivity between the monitoring target part and the temperature sensor 3, or the like. That is, the first temperature threshold and the second temperature threshold are set on the basis of the distance between the monitoring target part and the temperature sensor 3, the thermal conductivity between the monitoring target part and the temperature sensor 3, or the like. Furthermore, the first temperature threshold and the second temperature threshold are set for each piece of the posture information.

The heat generation determination unit 7 receives the posture information from the installation orientation calculation unit 4 and receives the temperature information from the temperature calculation unit 5. Furthermore, the heat generation determination unit 7 reads the constraint information 9 (first temperature threshold and second temperature threshold) corresponding to the posture information from the constraint information storage unit 6.

The heat generation determination unit 7 determines whether or not to reduce the power supply amount, on the basis of the posture information calculated by the installation orientation calculation unit 4, the temperature information calculated by the temperature calculation unit 5, and the first temperature threshold. Furthermore, the heat generation determination unit 7 determines whether or not to stop the power supply, on the basis of the posture information calculated by the installation orientation calculation unit 4, the temperature information calculated by the temperature calculation unit 5, and the second temperature threshold.

The heat generation determination unit 7 determines a power supply command to be output to the inverter circuit 8, on the basis of the temperature information, the posture information, and the constraint information 9. In a case where the temperature information exceeds the first temperature threshold corresponding to the posture information, the heat generation determination unit 7 outputs the power supply command to reduce the power supply, to the inverter circuit 8. That is, in a case where the temperature information exceeds the first temperature threshold corresponding to the posture information, the heat generation determination unit 7 reduces the power supply amount to the motor 20 by controlling the inverter circuit 8, and this suppresses heat generation of the motor control device 10. Note that the power supply command to reduce the power supply is, for example, a command to make at least one of a current value or a voltage value be smaller than a current value and a voltage value of the power supply command output to the inverter circuit 8 at a previous time, a command to correct at least one of the current value or the voltage value of the power supply command to be lowered, or the like.

Furthermore, in a case where the temperature information exceeds the second temperature threshold corresponding to the posture information, the heat generation determination unit 7 outputs the power supply command to stop the power supply, to the inverter circuit 8. That is, in a case where the temperature information exceeds the second temperature threshold corresponding to the posture information, the heat generation determination unit 7 stops the power supply to the motor 20 by controlling the inverter circuit 8, and this suppresses the heat generation of the motor control device 10. Note that the power supply command to stop the power supply is, for example, a command to set at least one of the current value or the voltage value to be zero, a command to correct at least one of the current value or the voltage value of the power supply command output to the inverter circuit 8 to zero, a command to block the power supply command output to the inverter circuit 8, or the like.

For example, in a case where the temperature information exceeds the first temperature threshold corresponding to the posture information of the printed circuit board 50 and does not exceed the second temperature threshold, the heat generation determination unit 7 controls the power supply amount to the motor 20 to an amount depending on the temperature information. That is, in a case where the temperature information exceeds the first temperature threshold corresponding to the posture information of the printed circuit board 50 and does not exceed the second temperature threshold, the heat generation determination unit 7 outputs, to the inverter circuit 8, a command to reduce a more power supply amount to the motor 20 as the temperature information indicates the higher temperature.

Note that, in a case where the temperature information exceeds the first temperature threshold corresponding to the posture information of the printed circuit board 50 and does not exceed the second temperature threshold, the heat generation determination unit 7 may control the power supply amount to the motor 20 to a fixed amount.

In the motor control device 10, the posture of the motor control device 10 is determined, on the basis of the posture of the printed circuit board 50. Furthermore, depending on the posture of the printed circuit board 50, the posture information between the temperature sensor 3 and a part other than the temperature sensor 3 (inverter circuit 8 in the embodiment) on the motor control device 10, disposed on the printed circuit board 50 is determined. Then, the temperature detected by the temperature sensor 3 differs depending on the posture information corresponding to a positional relationship between the temperature sensor 3 and the inverter circuit 8. For example, between a case where the posture of the printed circuit board 50 is a posture in which the temperature sensor 3 is on an upper side of the inverter circuit 8 and a case where the posture of the printed circuit board 50 is a posture in which the temperature sensor 3 is on a lower side of the inverter circuit 8, the temperature detected by the temperature sensor 3 differs. The motor control device 10 according to the present embodiment determines a heat generation state of the inverter circuit 8, on the basis of the temperature information corresponding to the detected temperature detected by the temperature sensor 3 on the printed circuit board 50, the posture information of the motor control device 10 (printed circuit board 50), and the constraint information 9. Then, the motor control device 10 controls the power supply amount to the motor 20, according to the heat generation state of the inverter circuit 8.

In this way, the control circuit 1 controls the inverter circuit 8 by outputting the power supply command for the motor 20 based on the temperature threshold (first and second temperature thresholds) set for each piece of the posture information, the posture information, and the temperature information, to the inverter circuit 8. That is, since the motor control device 10 can determine the heat generation state of the inverter circuit 8 on the basis of the posture information, it is possible to accurately monitor the temperature of the inverter circuit 8.

Figure 2:
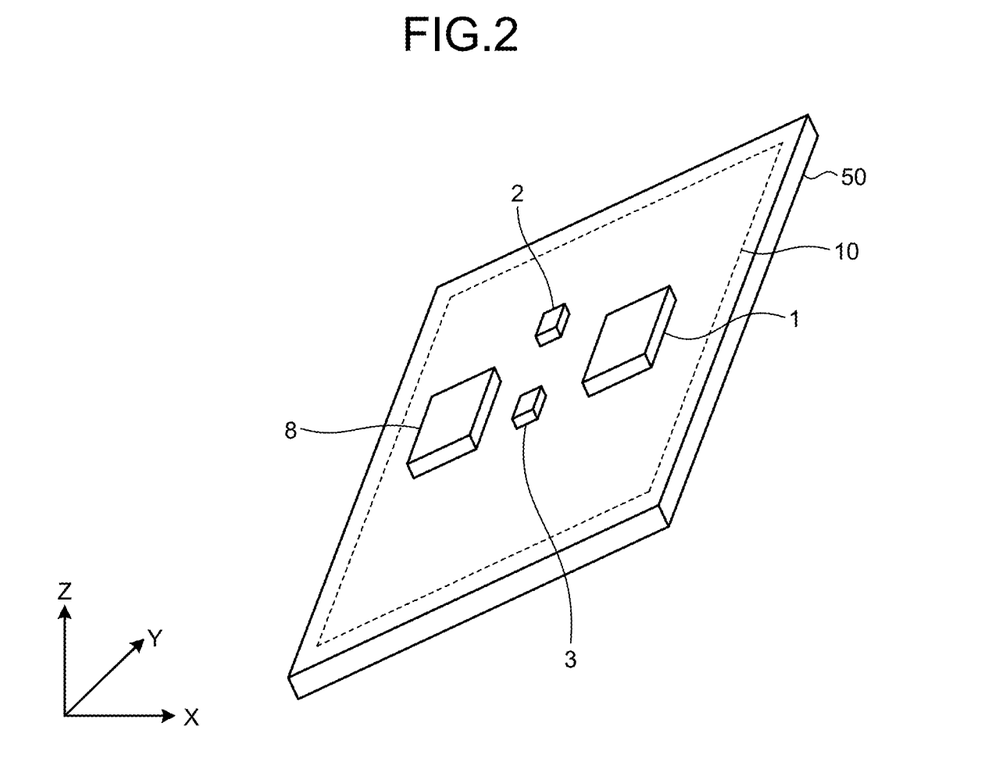
FIG. 2 is a diagram illustrating an example of an arrangement configuration of parts on a printed circuit board according to the embodiment.

FIG. 2 is a diagram illustrating an example of an arrangement configuration of parts on the printed circuit board according to the embodiment. On the printed circuit board 50, the control circuit 1, the acceleration sensor 2, the temperature sensor 3, and the inverter circuit 8 that are components (parts) of the motor control device 10 are disposed. Note that, parts other than those illustrated in FIG. 2 may be disposed on the printed circuit board 50.

On the printed circuit board 50, the control circuit 1, the acceleration sensor 2, the temperature sensor 3, and the inverter circuit 8 are fixed. Therefore, although the distance between the temperature sensor 3 and the inverter circuit 8 is unchanged, the positional relationship between the temperature sensor 3 and the inverter circuit 8 changes depending on the posture of the printed circuit board 50.

The printed circuit board 50 according to the present embodiment is disposed in a device including a motor such as a robot arm or an air conditioner, without being stored in a housing. The printed circuit board 50 is fixed to a specific member in various postures, in the device. That is, the printed circuit board 50 is disposed in the device in an arbitrary posture. Even in a case where the printed circuit board 50 is fixed to the specific member in any posture, the motor control device 10 controls the power supply amount to the motor 20 on the basis of the posture information.

In a case where the printed circuit board 50 is fixed to the specific member, there is a case where the posture of the specific member in the device changes. That is, the printed circuit board 50 is disposed such that the posture changes to an arbitrary posture after being installed. In this case, when the specific member changes the posture, the posture of the printed circuit board 50 also changes. For example, in a case where the printed circuit board 50 is disposed in a robot arm, the posture of the printed circuit board 50 changes according to an operation of the robot arm. That is, the positional relationship between the temperature sensor 3 and the inverter circuit 8 changes, according to an operation of the device in which the printed circuit board 50 is disposed. In the present embodiment, even in a case where the posture of the printed circuit board 50 changes, the motor control device 10 controls the power supply amount to the motor 20, on the basis of the posture information.

Figure 3:
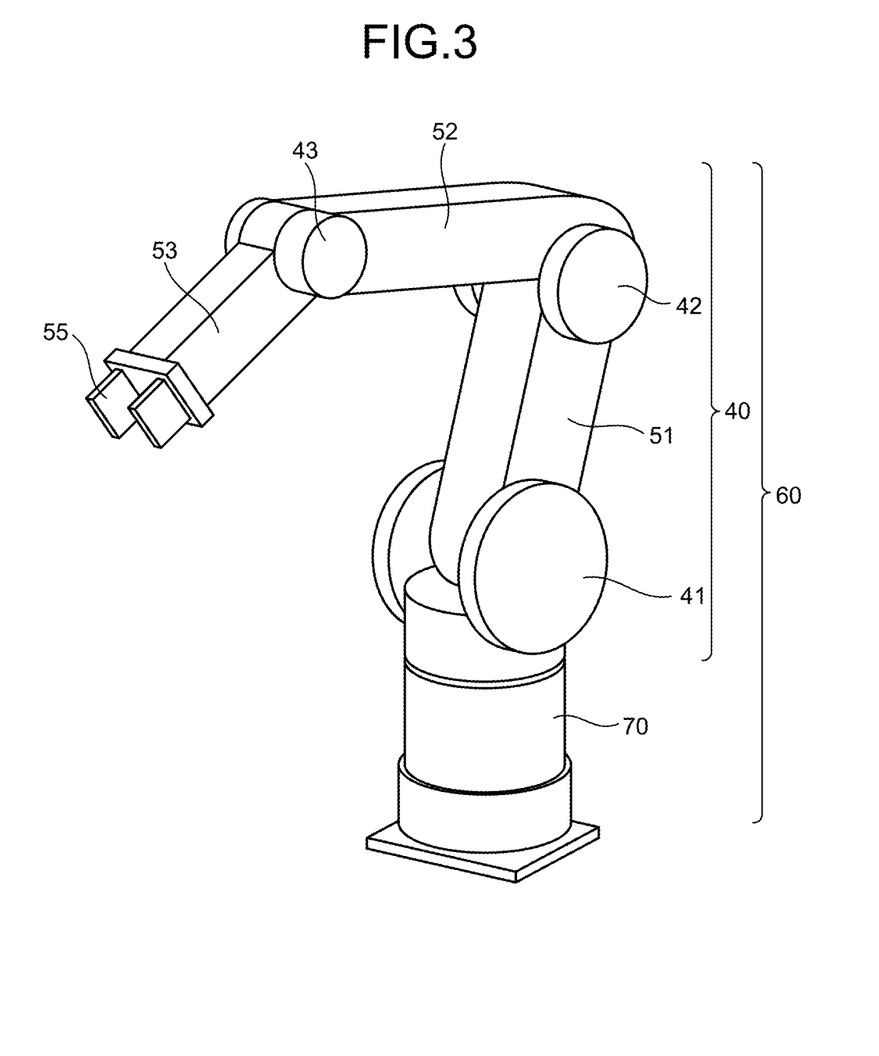
FIG. 3 is a diagram illustrating a configuration of a motor control system including the motor control device according to the embodiment.

FIG. 3 is a diagram illustrating a configuration of a motor control system including the motor control device according to the embodiment. Here, a motor control system 60 indicates a robot arm as an example. The motor control system 60 includes an arm portion 40 that is a movable portion and a base portion 70 coupled to the arm portion 40. The arm portion 40 includes joint portions 41 to 43, shaft portions 51 to 53, and a tip portion 55.

The shaft portion 51 is rotatably coupled to the base portion 70 via the joint portion 41. The shaft portion 52 is rotatably coupled to the shaft portion 51 via the joint portion 42. The shaft portion 53 is rotatably coupled to the shaft portion 52 via the joint portion 43. The tip portion 55 is coupled to the shaft portion 53. A hand that grips a workpiece is provided at the tip portion 55. Note that the joint portions 41 to 43 obtain driving forces directly or indirectly via a speed reducer, a gear, or the like, by driving the motor 20 (not illustrated) included in the motor control system 60 and operate the shaft portions 51 to 53.

The motor control system 60 can change a posture by rotating the joint portions 41 to 43 and move the tip portion 55 to various positions. The printed circuit board 50 is disposed in the arm portion 40 that is a movable portion. The printed circuit board 50 is disposed, for example, in the shaft portions 51 to 53. Note that the printed circuit board 50 may be disposed in the joint portions 41 to 43. The motor 20 is disposed, for example, in the joint portions 41 to 43. Note that the motor 20 may be disposed in the shaft portions 51 to 53.

The motor 20 is controlled by the motor control device 10 disposed on the printed circuit board 50 and rotates the joint portions 41 to 43. The joint portions 41 to 43 rotate to move the shaft portions 51 to 53, and as a result, the posture of the printed circuit board 50 changes. That is, the posture of the printed circuit board 50 changes according to an operation of the movable portion. The motor control device 10 controls the power supply amount to the motor 20, on the basis of the posture information corresponding to the posture of the printed circuit board 50.

The motor control device 10 is configured by the printed circuit board 50 on which the inverter circuit 8 is disposed and is not housed in the housing. Even in a case where the motor control device 10 is not housed in the housing in which a heat dissipation mechanism such as a heat sink is disposed or in a case where the installation posture changes independently from the housing, since the motor control device 10 can reduce the power supply amount to the motor 20 on the basis of the posture information, it is possible to protect the motor control device 10 from excessive heat generation.

Furthermore, since the motor control device 10 is not disposed in the housing, it is possible to reduce a size, and thus the motor control device 10 is disposed in the motor control system 60 in various postures. Even in this case, since the motor control device 10 can reduce the power supply amount to the motor 20 on the basis of the posture information, it is possible to protect the motor control device 10 from the excessive heat generation.

Furthermore, since the temperature sensor 3 is disposed on the printed circuit board 50 in the motor control device 10, it is possible for the temperature sensor 3 to directly monitor the temperature on the printed circuit board 50 on which the parts are mounted. As a result, in the motor control device 10, it is possible to reduce an error between the temperature of the part to be detected and the detected temperature detected by the temperature sensor 3.

Figure 4:
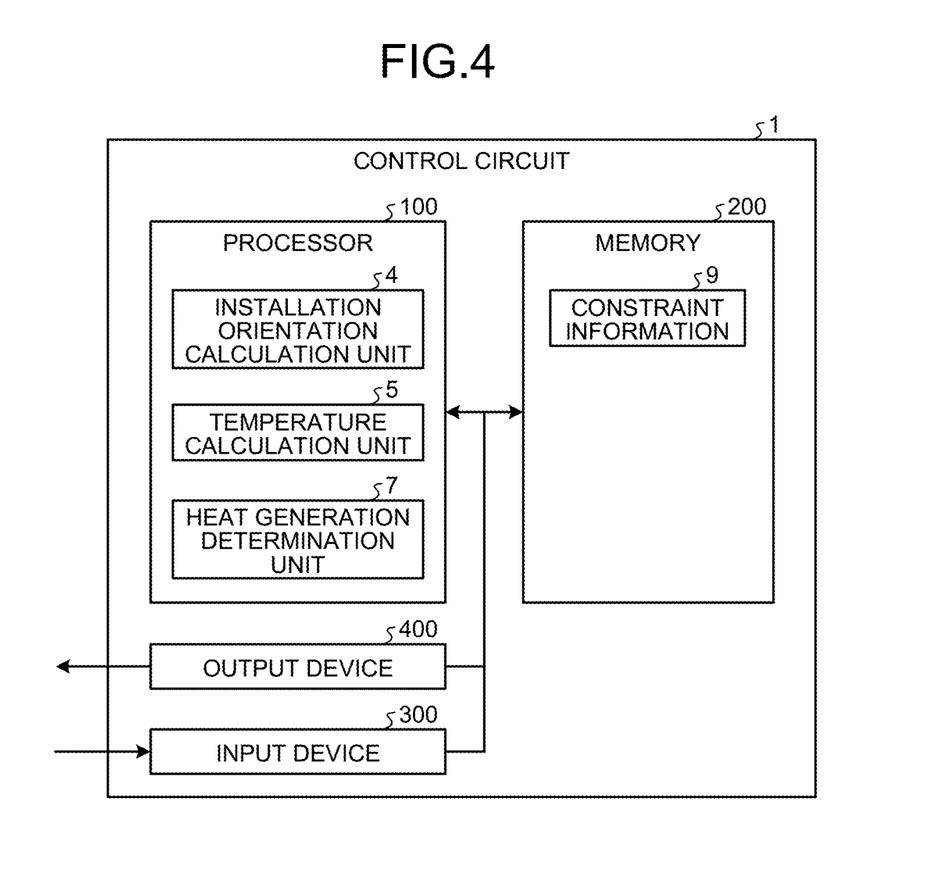
FIG. 4 is a diagram illustrating an example of a hardware configuration for implementing a control circuit included in the motor control device according to the embodiment.

Here, a hardware configuration of the control circuit 1 will be described. FIG. 4 is a diagram illustrating an example of a hardware configuration for implementing the control circuit included in the motor control device according to the embodiment. The control circuit 1 can be implemented by an input device 300, a processor 100, a memory 200, and an output device 400. The processor 100 is, for example, a central processing unit (CPU) (also referred to as central processing unit, central processing device, processing device, arithmetic device, microprocessor, microcomputer, and digital signal processor (DSP)) or a system large scale integration (LSI). The memory 200 is, for example, a random access memory (RAM) and a read only memory (ROM).

The control circuit 1 is implemented by the processor 100 reading and executing a control program, that can be executed by a computer, for executing an operation of the control circuit 1 stored in the memory 200. It can be said that the control program that is a program for executing the operation of the control circuit 1 makes the computer execute a procedure or a method of the control circuit 1.

The control program executed by the control circuit 1 has a module configuration including the installation orientation calculation unit 4, the temperature calculation unit 5, and the heat generation determination unit 7, and the installation orientation calculation unit 4, the temperature calculation unit 5, and the heat generation determination unit 7 are loaded on a main storage device, and the installation orientation calculation unit 4, the temperature calculation unit 5, and the heat generation determination unit 7 are generated in the main storage device.

The input device 300 receives the acceleration information from the acceleration sensor 2 and sends the acceleration information to the processor 100. Furthermore, the input device 300 receives the detected temperature from the temperature sensor 3 and sends the detected temperature to the processor 100.

The memory 200 stores the constraint information 9 or the like. The constraint information 9 is read by the processor 100 from the memory 200. Furthermore, the memory 200 is used as a temporary memory when the processor 100 executes various types of processing. The output device 400 sends the power supply command to the inverter circuit 8.

The control program may be stored in a computer-readable storage medium in a file in an installable format or executable format and provided as a computer program product. Furthermore, the control program may be provided to the control circuit 1 via a network such as the Internet. Note that some of the functions of the control circuit 1 may be implemented by dedicated hardware such as a dedicated circuit, and some may be implemented by software or firmware.

In this way, according to the embodiment, the motor control device 10 outputs the power supply command based on the temperature threshold (constraint information 9) set for each piece of the posture information, the posture information, and the temperature information to the inverter circuit 8. As a result, the motor control device 10 can control the motor according to an accurate heat generation state of the part mounted on the printed circuit board 50.

The configurations illustrated in the above embodiment indicate an example and can be combined with other known technique. Furthermore, the configurations illustrated in the embodiment can be partially omitted or changed without departing from the scope.

REFERENCE SIGNS LIST 1 control circuit; 2 acceleration sensor; 3 temperature sensor; 4 installation orientation calculation unit; 5 temperature calculation unit; 6 constraint information storage unit; 7 heat generation determination unit; 8 inverter circuit; 9 constraint information; 10 motor control device; 20 motor; 40 arm portion; 41 to 43 joint portion; 50 printed circuit board; 51 to 53 shaft portion; 55 tip portion; 60 motor control system; 70 base portion; 100 processor; 200 memory; 300 input device; 400 output device.

The invention claimed is:

1. A motor control device comprising:

an acceleration sensor to be disposed on a printed circuit board, detect an acceleration corresponding to a posture of the printed circuit board, and output, as acceleration information, the acceleration detected;

a temperature sensor to be disposed on the printed circuit board, detect a temperature on the printed circuit board, and output, as detected temperature, the temperature detected;

an inverter circuit to be disposed on the printed circuit board and drive a motor; and a control circuit to be disposed on the printed circuit board, calculate posture information indicating the posture of the printed circuit board on the basis of the acceleration information, calculate temperature information indicating a temperature of a part disposed on the printed circuit board on the basis of the detected temperature, and control the inverter circuit by outputting, to the inverter circuit, a power supply command for the motor based on a temperature threshold set for each piece of the posture information, the posture information, and the temperature information.

2. The motor control device according to claim 1, wherein the temperature threshold is set on the basis of an arrangement relationship between the part and the temperature sensor.

3. The motor control device according to claim 1, wherein the temperature threshold includes a first temperature threshold and a second temperature threshold higher than the first temperature threshold, and in a case where the temperature information exceeds the first temperature threshold, the control circuit outputs, to the inverter circuit, a command to reduce a power supply amount to the motor, and in a case where the temperature information exceeds the second temperature threshold, the control circuit outputs, to the inverter circuit, a command to stop power supply to the motor.

4. The motor control device according to claim 3, wherein in a case where the temperature information exceeds the first temperature threshold and the temperature information does not exceed the second temperature threshold, the control circuit outputs, to the inverter circuit, a command to reduce a more power supply amount to the motor as the temperature information indicates a higher temperature.

5. The motor control device according to claim 1, wherein the part is the inverter circuit.

6. The motor control device according to claim 1, wherein the printed circuit board is disposed in a movable portion of a device that includes the motor, and the posture changes according to an operation of the movable portion.

7. A motor control system comprising:

the motor control device according to claim 6; and the movable portion.

* * * * *